Figure 2:
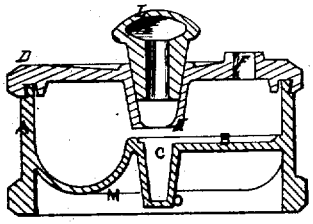

S. DARLING.

Inkstands.

No. 6,574. Reissued Aug. 3, 1875.

Witnesses
J. S. Ingraham
John E. Keall.

Inventor
Samuel Darling

N. PETERS, PHOTO-LITHOGRAPHER, WASHINGTON, D. C.

BEST AVAILABLE COPY

UNITED STATES PATENT OFFICE.

SAMUEL DARLING, OF PROVIDENCE, RHODE ISLAND.

IMPROVEMENT IN INKSTANDS.

Specification forming part of Letters Patent No. 111,435, dated January 31, 1871; reissue No. 6,443, dated May 25, 1875; reissue No. 6,574, dated August 3, 1875; application filed July 9, 1875.

*To all whom it may concern:*

Be it known that I, SAMUEL DARLING, of Providence, in the State of Rhode Island, have invented certain Improvements in Inkstands; and I do hereby declare that the following, taken in connection with the drawing, which accompanies and forms part of this specification, is a description of my invention sufficient to enable those skilled in the art to practice it.

My improvements relate to a novel mode of constructing more especially non-spilling inkstands, but are applicable, in part, to other kinds; and consist in making an inkstand with an elevated dipping-cup within the ink-reservoir; a deep cavity smaller than the width of an ordinary writing-pen in the reservoir, extending below the bottom; an ink-receiving recess in the upper part above the reservoir, and a cork-hole; and also with an external recess under the bottom of the inkstand, surrounding a central leg, which contains the deep cavity and a hollow elastic stopper, the construction and arrangement of which will hereinafter be more fully explained and set forth.

One form in which I have embodied my improvements I have illustrated in the accompanying drawing, in which—

Figure 1:
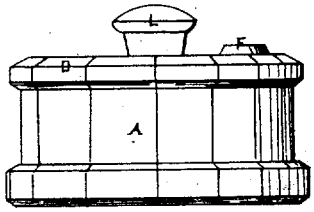
Figure 3:
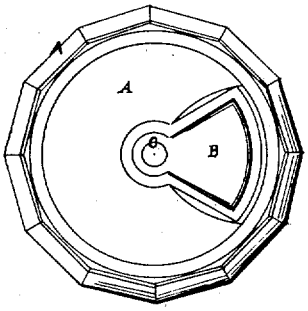
Figure 4:
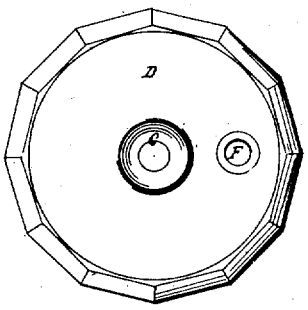
Figure 5:
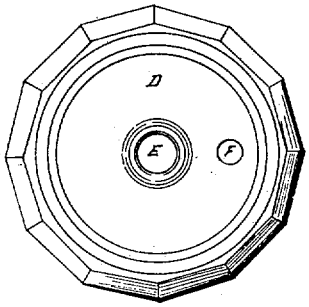

Figure 1 represents an elevation of an inkstand, and Fig. 2 a central vertical section of the same, showing my novel features. Fig. 3 is a plan view of the lower part before the top has been put on, and Figs. 4 and 5 are plan views, respectively, of the stand with the elastic stopper removed, and of the top part or piece, as seen on its under side.

My inkstand may be made of glass or other molten, molded, or cast material; but I prefer to make it of glass, and in two parts, as a more desirable form can be obtained by pressing the parts separately.

A is the lower part or reservoir; B, the elevated dipping-cup, having walls around it of proper height, as seen in the drawing, the chamber formed by these walls constituting, in connection with the deep cavity C, the dipping-gage, the object of such gage being to determine and limit positively, by the height of the walls, the amount of ink to be taken upon the pen, which ink can never have a depth greater than the prescribed height of the walls permits. D is the top part, constructed to be united to the lower part by an ink-tight joint. E is the dipping tube or orifice, through which the pen is to be passed to take its supply of ink from the dipping-cup B, and which also forms a downwardly-projecting annular wall to prevent the ink from falling out when the inkstand is tipped or inverted, either to supply the dipping-cup from the reservoir A, or by accident, or when being carried in a trunk, valise, or the pocket. The opening in the lower part of the dipping orifice or tube is made of sufficient size for any ordinary writing-pen to pass freely through it to the dipping-cup, and the lower end of this dipping tube or orifice is entirely above the ink in the reservoir, when the inkstand is properly supplied with ink and ready for use. The hole F is for the escape of air when the inkstand is being supplied with ink, which is done through the dipping tube or orifice E, this hole F being kept tightly corked or closed when the inkstand is in use. It is also used for pouring out from the reservoir ink or water, when necessary. The wall of the dipping-cup B, it will be seen, is quite shallow. It is not necessary for it to hold much ink at a time, as it can be so easily replenished by the mere tipping of the inkstand. The upper part of cavity C, which opens into the dipping-cup B, is made less in size than the width of an ordinary writing-pen, thus preventing positively any descent of the pen beyond a premeditated point, the tip of the pen being also, by reason of the depth of this cavity, prevented from ever touching bottom, and from being thereby injured, or from coming in contact with any sediment that might be collected there. This cavity also enables the writer to use nearly all of the ink in the reservoir, so that it can be cleansed as often as it is filled without loss of ink, that would otherwise take place. The supply of ink should not be more than the stand will hold when inverted, preferably a little less than this; but any lesser quantity will be sufficient for present use, so long as there be enough to supply the chamber B; and whether the bottom of the reservoir A be flat on its inside or rounded up, as shown in the drawing, will be unimportant, so far as relates to the operation of the inkstand or the supply of the chamber B.

M represents an external recess under the bottom of the inkstand, in the center of which is the leg O, containing the cavity C. This recess is for the purpose of making the inkstand lighter, and thereby more portable and less expensive. L is the tubular stopper formed of india-rubber or equivalent elastic material, and having a chambered top, as seen, the chamber communicating with the bore of the tube.

With ordinary solid stoppers, when they are pressed down tightly, the air is compressed inside of the inkstand; and for the purposes for which it is more especially designed—namely, for children's and family use, and for traveling—this is objectionable, because when somewhat heated, and even when not, the compressed air has a tendency to force out the ink around the stopper when the stand gets inverted, and much damage and inconvenience result.

In using my stopper, its head or bulb is compressed between the thumb and finger as it is about to be applied, and a portion of the air expelled from it, so that it will admit of being pressed down into the mouth or tube of the inkstand without leaving any compressed air within, as a part of the air is free to rise in the stopper to supply the vacuum previously created therein.

A thin pipe may, if thought desirable, be inserted in that portion of the stopper which enters the inkstand to prevent its collapsing, so as to close the hole.

Having thus fully described my improvements, it will be seen that my inkstand is simple, easy to operate, and possesses many desirable qualities.

What I claim, and desire to secure by Letters Patent, is—

1. The combination, in an inkstand, of an ink-reservoir, an elevated dipping-cup within the reservoir, and an ink-receiving recess in the upper part, substantially as described.

2. The combination, in an inkstand, of an ink-reservoir and a pen-gage, such gage consisting of a cup or chamber, and a deep narrow cavity, leading downward from the bottom of this cup or chamber, the upper end of said cavity, which opens into the cup, being made smaller than the width of an ordinary writing-pen, when the height of the walls surrounding the cup or chamber regulates the amount of ink to be taken upon the pen, substantially as described.

3. The combination, in an inkstand, of an ink-reservoir or central dipping orifice or tube, an ink-receiving recess in the upper part surrounding the dipping-orifice and a cork-hole, the lower opening of the dipping-orifice being larger than an ordinary writing-pen, and above the ink when in use, substantially as described, and for the purpose herein set forth.

4. The combination, in an inkstand, of an ink-reservoir, a central dipping-orifice, an ink-receiving recess in the upper part of the inkstand, and a deep narrow cavity in the lower part, the upper part of said deep cavity being less in size than the width of an ordinary writing-pen, substantially as described and herein set forth.

5. The combination, in an inkstand, of an ink-reservoir, a central dipping-orifice, an ink-receiving recess in the upper part of the inkstand, a deep narrow cavity in the lower part, said cavity being less in size than the width of an ordinary writing-pen, and an external recess under the bottom surrounding a central leg, which leg contains said deep cavity, substantially as described, and for the purpose herein set forth.

6. The combination, in an inkstand, of an ink-reservoir and an elastic stopper, such stopper having an air-chamber in its upper part or head, and a small air-duct through the lower part, which is inserted into the inkstand, thus providing a free passage for air from the chamber in the head of the stopper to the interior of the reservoir, substantially as described.

SAMUEL DARLING.

Witnesses:
JOHN E. HALL,
HENRY R. DAVIS.